3,190,857
DESTRUCTION OF UNREACTED ISOCYANATO GROUPS IN POLYURETHANE ELASTOMERS BY EXPOSURE TO STEAM

Ernest E. Fauser, Cuyahoga Falls, and Frank S. Farson, Akron, Ohio, assignors to The Goodyear Tire & Rubber Company, Akron, Ohio, a corporation of Ohio
No Drawing. Filed Oct. 29, 1959, Ser. No. 849,435
4 Claims. (Cl. 260—77.5)

This invention relates to a process for the stabilization of freshly prepared polyurethane elastomer to maintain said elastomer in a processable plasticity range for a reasonable time to permit the elastomer to be fabricated or shaped into a manufactured object and to the stabilized product of said process. More particularly, this invention relates to a process for destroying the unreacted or free isocyanate present in freshly prepared polyurethane elastomer to prevent further crosslinking or curing of the elastomer to give a material which is no longer processable.

Even though polyurethane elastomers have physical properties excellently suited for most uses, these elastomers have not been utilized to the fullest extent due to their objectionable property of fast curing to yield a product very difficult to process. Previously a number of expedients have been utilized to prolong the time freshly prepared polyurethanes are in the easily processable state. For example, low molecular weight alcohols have been used to slow up the rate of cure of the polyurethane elastomers but these methods are only able to keep the polyurethane in the readily processable state for a very short time, usually a matter of hours at the most.

Applicants have discovered that freshly prepared polyurethane elastomers may be stabilized within the processable range for an extended period of time by sheeting the freshly prepared elastomer and subjecting the sheeted material to a steam treatment for sufficient time to destroy the free isocyanate present in the elastomer. The steam treatment should be sufficient to neutralize or destroy any free isocyanate present in the elastomer. Usually steam treatments of about 5 to 30 minutes at 5 to 30 pounds of pressure is adequate to accomplish this objective when the elastomer is present in sheets less than a quarter of an inch thick. If the sheet is thinner, the amount of steam and length of steaming necessary to destroy the unreacted isocyanate will be reduced. On the other hand, thicker sheets, up to about ½ to ¾ inch will need to be steamed at higher pressures and for a longer time. It is preferred that the steam treatment be about 1 to 10 minutes at 5 to 10 pounds pressure and that the polyurethane elastomer strip be no thicker than about $\frac{1}{16}$ of an inch.

This method of stabilizing polyurethane elastomer is applicable to all types of elastomers prepared by the reaction of polyisocyanates with a reactive hydrogen containing compound such as the polyesteramides, polyether glycols or the polyesters. The term "reactive hydrogen compounds" is limited to those polyfunctional compounds which have hydrogens that are reactive with Zerewitinoff reagent.

The reactive-hydrogen-containing compounds, such as polyesters, polyesteramides and alkylene glycols, useful in this invention normally have a molecular weight of about 750 to 10,000 and preferably 1500 to 3500. Specific examples of these hydroxyl-terminated polyesters are ethylene glycol adipate, propylene glycol adipate, butylene glycol adipate, polyethylene glycol suberate, polyethylene glycol isosebacate and related alkyd resins having at least two hydroxyl groups. Specific examples of suitable polyether glycols are polyethylene glycol, polypropylene glycol, tetramethylene glycol, etc.

Examples of the polyisocyanates are tolylene diisocyanate, xylylene diisocyanate, phenyl diisocyanate, diphenyl methane diisocyanate, hexamethylene diisocyanate, tolidine diisocyanate, to mention only a few of the many useful materials. The following United States patents, 2,625,531; 2,625,532; 2,625,535; 2,692,873 and 2,702,797, list additional polyisocyanates and reactive-hydrogen-containing compounds useful in this invention.

It is also known in the art to use accelerators and catalysts in the production of polyurethane elastomers. These may be used also in this invention. For example, a polyester of about 3000 molecular weight may be reacted with a slight excess of tolylene diisocyanate and then a small amount of a diamine or monomeric diol, such as 1,4-butane-diol, may be used to crosslink or vary the properties of the finished elastomers. These modifications well known to the polyurethane elastomer art, may be used in connection with the preparation of the fresh elastomer to be stabilized by this invention. Generally, from about 0.9 to 2 molar ratios of diisocyanate are used for each mol of reactive hydrogen compound. These materials may be reacted by the prepolymer method and further treated with polyisocyanate to produce the elastomer or they may be treated in accordance with the one-shot process to produce the polyurethane elastomers.

The exact nature of this invention will be further illustrated in the following examples where the reactants are given in part by weight.

EXAMPLE 1

An ethylene glycol adipate ester having a reactivity number of 59.8 milliequivalents of KOH per gram was prepared by reacting an excess of ethylene glycol with adipic acid. One thousand parts of this polyester were added to 239 parts of tolidine diisocyanate within a resin kettle equipped with a thermocouple and a stirrer. The kettle was evacuated and an atmosphere of nitrogen obtained by introducing nitrogen gas into the kettle. The materials were reacted for 38 minutes at 135° C. Then the heat on the kettle was turned off but the operation of the stirring was continued for another 10 minutes at which time the temperature of the reactions had risen to 154° C. The reaction product was poured into an aluminum tray and placed in an oven at 120° C. for 5 hours. The aluminum tray was removed from the oven and cooled. The reaction product was placed immediately upon a rubber mill and sheeted into thin sheets $\frac{1}{16}$ inch in thickness. Part of this sheet was placed over a ¼ inch mesh hardware cloth and placed in a steam autoclave. The steam treatment within the autoclave was for 15 minutes at 10 pounds per square inch live steam pressure. The steam treated rubber was removed from the autoclave and dried for 2 hours at 158° F. and remilled to give a compact mass. The plasticity of a test sample from the compacted mass was compared with that of a control sample which had not been subjected to the live steam autoclave treatment. The plasticity of each sample was determined on the Tinius Olsen flowmeter at a temperature of 212° F. and a pressure of 500 pounds per square inch. The Tinius Olsen flow values, seconds required to obtain one inch of flow, are shown in Table 1 below. From this data it will be observed that the steam treated polyurethane elastomer did not appreciably change in plasticity over a period of 28 days while the control increased several fold in its plasticity.

Table 1

| Time, Days | Tinius Olsen Flow Values (Seconds/Inch) | |
|---|---|---|
| | Control | Steam Treated |
| Initial | 169 | 82 |
| 7 | 522 | 86 |
| 14 | 445 | 83 |
| 28 | 921 | 94 |

EXAMPLE 2

A propylene glycol phthalic acid ester was prepared according to the procedure of Example 1 and reacted with tolidine diisocyanate to form a polyurethane elastomer. This elastomer was sheeted on a rubber mill and part thereof was subjected to a live steam treatment in an autoclave for 5 minutes at 10 pounds per square inch steam pressure. Table 2 shows the change in Tinius Olsen plasticity values with time between the steam stabilized sample and the sample not steam stabilized. After 56 days the control had a Tinius Olsen flow value at least four times the steam treated sample.

Table 2

| Time, Days | Tinius Olsen Flow Values (Seconds/Inch) | |
|---|---|---|
| | Control | Steam Treated |
| Initial | 182 | 161 |
| 7 | 500 | 180 |
| 14 | 632 | 159 |
| 28 | 888 | 180 |
| 56 | 800 | 143 |

EXAMPLE 3

A polyether glycol of about 2500 molecular weight was reacted with tolylene diisocyanate to give a polyurethane elastomer. Part of this elastomer was sheeted and subjected to live steam treatment for a period of 25 minutes at 15 pounds per square inch pressure. After seven days this sample still exhibited a negligible increase in Olsen flow values.

While certain representative embodiments and details have been shown for the purpose of illustrating the invention, it will be apparent to those skilled in the art that various changes and modifications may be made therein without departing from the spirit or scope of the invention.

What is claimed is:

1. In a process for preparing processable polyurethane elastomers exhibiting during aging substantial resistance to change of its Tinius Olsen flow value as measured at the temperature of 212° F. and 500 pounds per square inch pressure, the steps comprising (1) preparing a processable polyurethane elastomer by (A) forming a reaction mixture comprising 0.9 to 2 mols of an organic polyisocyanate for each mol of a reactive hydrogen-containing compound having a molecular weight of about 750 to no greater than 10,000, (B) reacting together the ingredients of said mixture to form a reaction product, and (C) subjecting said reaction product to a heat treatment until it has a Tinius Olsen flow value of about 182, and (2) subjecting the product of 1(C) in sheet form to steam vapor for a time sufficient to destroy any free isocyanate groups present, said reaction product having been formed into a sheet having a thickness of about .25 inch after step 1(B) and prior to step 2; said reactive hydrogen containing compound being selected from the class consisting of polyesters, polyesteramides and polyether glycols.

2. The process of claim 1 wherein the molecular weight of the reactive hydrogen-containing compound is about 1500 to 3500.

3. The process of claim 1 wherein the polyurethane sheet has a thickness less than one-fourth inch.

4. The process of claim 3 wherein the steam treatment comprises subjecting the sheet to steam vapor at a pressure of about 5 to 10 pounds per square inch for about one to twenty minutes.

References Cited by the Examiner

UNITED STATES PATENTS

| 2,729,618 | 1/56 | Müller | 260—75 |
| 2,729,666 | 1/56 | Stullman | 18—55 |
| 2,850,467 | 9/58 | Livingood | 18—48 |
| 2,871,226 | 1/59 | McShane | 260—77.5 |
| 3,027,276 | 3/62 | Cohen et al. | 260—77.5 |
| 3,055,871 | 9/62 | Hefler | 260—77.5 |

FOREIGN PATENTS 207,057   9/55   Australia.

OTHER REFERENCES

Satterly: "Foamed Isocyanates," Product Engineering, February 1955, pages 140–143.

LEON J. BERCOVITZ, *Primary Examiner.*

ALEXANDER H. BRODMERKEL, MILTON STERMAN, HAROLD N. BURSTEIN, *Examiners.*